Oct. 26, 1948.  G. S. ELLIOTT  2,452,295
FAUCET
Filed Oct. 10, 1947

INVENTOR.
George S. Elliott
BY Barnes, Kisselle, Laughlin & Raisch
ATTORNEYS

Patented Oct. 26, 1948

2,452,295

UNITED STATES PATENT OFFICE 2,452,295

FAUCET

George S. Elliott, Detroit, Mich.

Application October 10, 1947, Serial No. 779,107

3 Claims. (Cl. 277—20)

This invention relates to a valve construction and it has to do particularly with a faucet for the outlet of hot and cold water. A valve of the class in which the present invention falls is often termed a mixing valve, considering it may be used to control the combined outlet of cold water and hot water to attain the desired temperature. This application is a continuation in part of application Serial No. 565,940 filed November 30, 1944, which has become abandoned.

The principal object of the invention is to provide a valve of the so-called mixing type which embodies a simple construction capable of economical manufacture and of sale to the public at a low cost and which may be constructed largely of parts which are in the nature of standard construction. Accordingly, only a very few parts need be manufactured to provide the valve of this invention and these parts, coupled with other parts of usual construction, or of a construction which is unaltered relative to present manufacturing practice, provides the complete valve. A further object of the invention is to provide a mixing valve with controlling means in the nature of a rotary stem equipped with a suitable handle and which has an unlimited rotary movement. Accordingly, the controlling stem may be rotatably adjusted in any direction of rotation through an excess of 360° although only a few degrees of movement is required to open or close the valve.

A further object of the invention is to provide a valve construction where the operating handle may be positioned to provide a mixture of hot and cold water and wherein the proportion of the mixture may be varied in this position of the handle. This is accomplished by a mounting which may be set and left relatively permanently according to the desires of the user or the temperatures of the hot and cold water.

The valve constructed in accordance with the invention is disclosed in the accompanying drawings. In these drawings.

Figure 1:
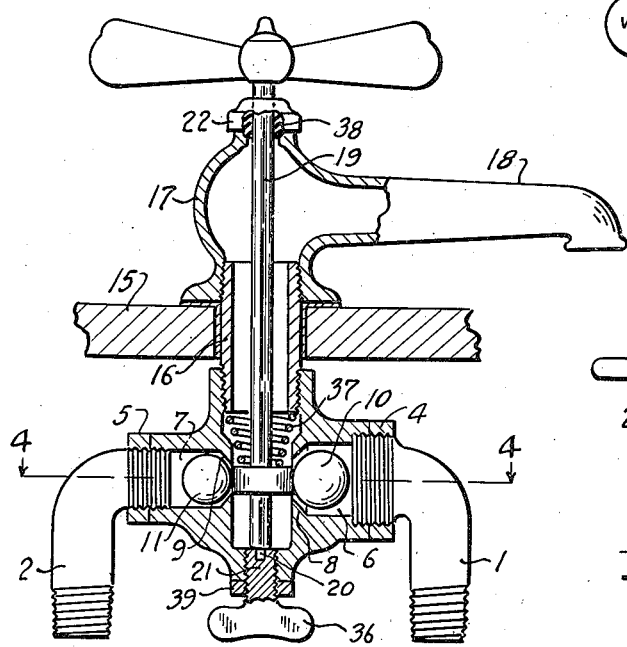
Fig. 1 is a sectional view taken through a valve constructed in accordance with the invention showing the outlet spigot removed 90° from its usual location in order to demonstrate the full construction.

As illustrated in Fig. 1, a cold water supply pipe is shown at 1 and a hot water supply pipe is shown at 2. The valve body is illustrated at 3 and it has extending portions 4 and 5 for receiving the cold and hot water supply pipes. The usual threaded connection is preferably employed. This body has a valve chamber 6 and a valve chamber 7, these chambers being preferably diametrically opposite each other and each is provided with a seat 8 and 9. Ball valves are used and in the chambers 6 and 7 are ball valves 10 and 11.

The ball valves may lie freely in the chambers and may be held against their seats when in closed position by the pressure of the water. The fact that the supply pipes 1 and 2 are threaded into the extensions 4 and 5 holds the ball valves from displacement in their chambers. This body portion of the valve may be, and preferably is, disposed in a concealed position behind or below the wall or panel 15 of any suitable wall or support or portion of a sink or tube with which the valve is to be used. A suitable plumbing nipple 16 passes through an opening in the panel 15, as illustrated, and is screw threaded to the body. The outlet fitting or spigot has a hollow body 17 provided with an outlet portion 18 and the hollow body is positioned in alignment with the hollow body 3 and the nipple 16. A stem 19 passes through the body 17 and the nipple and at its lower end has an ensmalled part or end as at 20. The lower end of the stem is piloted in an adjustable manner so that the axis of the stem may be varied to thus vary the position of the cam 28. To this end, there is a plug or mounting member 21 which may be screw threaded into the body provided with an eccentrically disposed recess 35. The plug or screw 21 may have an operating finger piece 36 and may have a lock nut 39. A spring 37 which may react against the end of the nipple 16 holds the pointed end of the stem seated in the recess 35.

Figure 4:
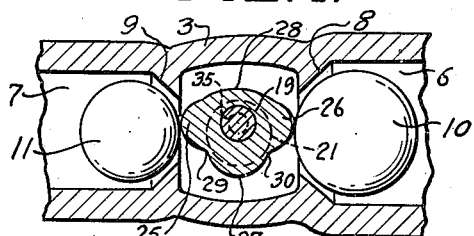
Fig. 4 is an enlarged cross sectional view taken substantially on line 4—4 of Fig. 1 showing the valve in a position with both the hot and cold water valves open.

This stem 19 is provided with a cam construction for controlling the ball valves 10 and 11. This cam construction is arranged so that both valves may be opened simultaneously or one valve may be open while the other is closed. The cam construction may be formed integral with the stem 19. As shown in Fig. 4, the cam construction embodies three lobes or high points 25, 26 and 27. The lobes 25 and 26 are diametrically opposite each other and, as shown in Fig. 4, when positioned to engage the balls 10 and 11 both the hot water valve and the cold water valve are open. The lobe 27 is positioned opposite a low part or dwell 28 and there are dwells in the cam formation 29 and 30.

Figure 5:
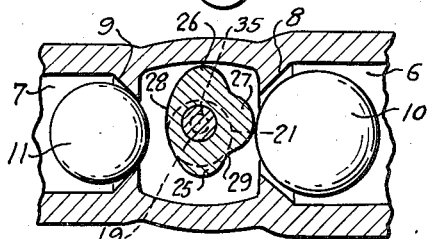
Fig. 5 is a view similar to Fig. 4 showing the cold water supply open and the hot water supply closed.
Figure 6:
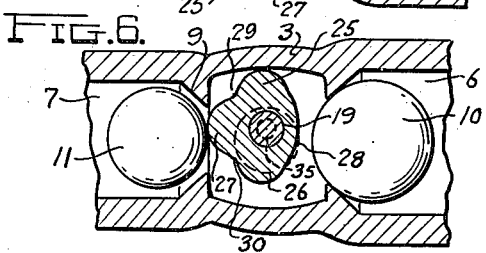
Fig. 6 is a view similar to Figs. 4 and 5 showing the hot water valve open and the cold water valve closed.
Figure 7:
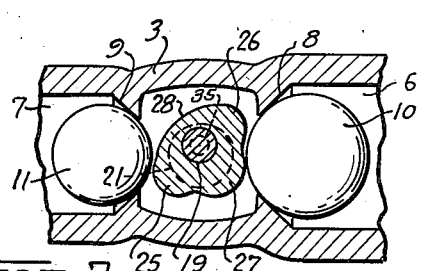
Fig. 7 is a view similar to Fig. 4 showing both valves closed.

When the valve is positioned, as shown in Fig. 5, with the lobe 27 engaging the ball 10, the cold water supply is open. It will be understood that when any one of the dwells is positioned adjacent a ball valve, that there is sufficient clearance for the ball valve to close upon the seat. Accordingly, in the Fig. 5 position, the hot water supply is closed. When the valve is positioned, as shown in Fig. 6, the hot water supply valve is open and the cold water supply valve is closed. Fig. 7 shows one of three positions where the dwells of the cam construction are adjacent the ball valves and, accordingly, both of them are closed.

Figure 8:
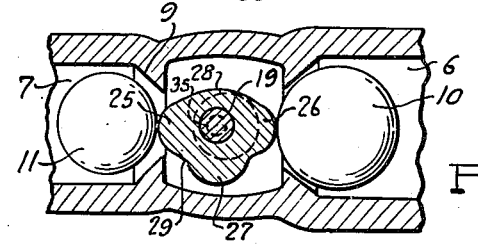
Fig. 8 is a view similar to Fig. 4 showing the valve adjusted to provide more of one type of water than the other.

By rotatably adjusting the mounting member 21 the piloted end of the stem may be shifted as its pointed end follows the recess 35. This, in effect, shifts the cam 28 to thus vary its action on the ball valves 10 and 11. As shown in Fig. 4, the adjustment is such that the cam 28 is substantially centrally positioned between the balls 10 and 11. As shown in Fig. 8, the member 21 has been adjusted through about 90° thus shifting the lower end of the stem and the cam to the left as Figs. 1, 4 and 8 are viewed. Thus, the hot water valve 11 is opened more than it is in Fig. 4 and the cold water valve 10 opened less. This lateral adjustment of the lower end of the stem is permitted as the stem may oscillate somewhat in the packing material 38 in the nut 22. A user of the valve who may have knowledge of just about how hot the hot water is and how much is required to provide the desired temperature of the mixed hot and cold water may set the adjustable mounting member 21 and leave it in this position relatively permanently. Then when the valve is adjusted by means of its handle to the Fig. 4 or Fig. 8 positions, the desired temperature of the water issuing from the outlet is attained. The setting of the mounting member 21 may be varied to meet a situation where the cold water is colder in the winter than it is in the summer. Then too, it may be varied as frequently as desired either before or after the handle of the valve has been adjusted to open the valve to the Fig. 4 or Fig. 8 positions.

Figure 2:
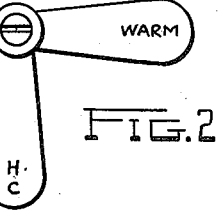
Fig. 2 is a top plan view of one form of handle construction.
Figure 9:
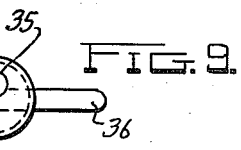
Fig. 9 is a view of the adjustable pilot seat.

One form of controlling handle construction is shown in Fig. 2. This handle has three projections or handle portions 31, 32 and 33. Portions 31 and 32 are positioned diametrically opposite each other and are in alignment with the lobes 25 and 26. These two handle portions may be suitably labeled and one manner of labeling them is with the letter "W," indicating warm, or the complete word "warm" may be placed thereon. When these handles are positioned as shown in Fig. 2, both valves are open. Accordingly, both valves are open and the hot and cold water flows into the valve body and through the spigot. A slight oscillation of the valve one way or the other may control the ratio of hot and cold water to govern the temperature. The handle 33 may be labeled to indicate both hot and cold, as for example, by the initials "H" and "C." When the handle shown in Fig. 2 is rotated through 90° in either direction, one or the other of the valves will be open. Movement of the handle shown in Fig. 2, about 45° in either direction, would result in closure of both valves as will be appreciated by reference to Fig. 7.

Figure 3:
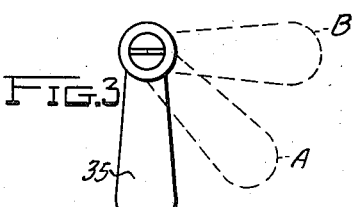
Fig. 3 is a view of an alternative form of handle construction showing several positions in dotted lines.

Another form of handle is illustrated in Fig. 3 where there is a single handle 35. In the full line position shown, the arrangement may be that both hot and cold valves are open. If this single handle is moved about 45° in either direction as, for example, to the dotted line position shown at A, both valves are closed. If this single handle is moved about 90° in either direction as, for example, to the dotted line position shown at B, one of the valves is open.

The simplicity of this valve construction is at once apparent in that a minimum of new manufactured parts are required. These parts comprise the stem 19 with its cam construction, the body 3 and the piloting plug 21. The balls, themselves, may be of standard construction, preferably of a corrosion resisting material, such as a cuprous metal and the water supply pipes 1 and 2 are of standard construction. The outlet part 17, together with the packing gland through which the stem extends may be standard except where the three handle portions are provided as shown in Fig. 2. One ball valve may be larger than the other for different rates of flow of water. As shown, the cold water ball valve is the larger, but this arrangement may be reversed.

I claim:

1. A mixing type valve for hot and cold water control comprising, a body having a substantially central chamber therein, two substantially oppositely disposed valve chambers in the body for connection to hot and cold water supply pipes, said valve chambers opening into the central chamber, a valve member in each valve chamber, a seat in each valve chamber upon which the valve members seat to close the chambers, outlet means leading from the chamber, an operating stem journalled near one end and having an accessible operating stem, said stem extending through the chamber, a cam construction on the stem at the location of the valve members having two substantially opposite lobes and a single lobe positioned substantially midway between the two opposite lobes, dwell portions between the lobes, said lobes being operable on the valve members to displace the valve members from their seats, the dwells being inoperable on the valve members, whereby both valves may be opened by the opposite lobes and one valve opened by said one lobe, and adjustable means for piloting the end of the stem opposite the journalled end and operable to adjustably shift the piloted end of the valve stem between the two valve chambers whereby the degree of opening of the two valve members relative to each other may be varied.

2. A mixing type valve for hot and cold water control comprising, a body having a substantially central chamber therein, two substantially oppositely disposed valve chambers in the body for connection to hot and cold water supply pipes, said valve chambers opening into the central chamber, a valve member in each valve chamber, a seat in each valve chamber upon which the valve members seat to close the chambers, outlet means leading from the chamber, an operating stem journalled near one end and having an accessible operating stem, said stem extending through the chamber, a cam construction on the stem at the location of the valve members having two substantially opposite lobes and a single lobe positioned substantially midway between the two opposite lobes, dwell portions between the lobes, said lobes being operable on the valve members to displace the valve members from their seats, the dwells being inoperable on the valve members, whereby both valves may be opened by the opposite lobes and one valve opened by said one lobe, a rotatable mounting member in the valve body having an eccentrically disposed recess, the end of the stem opposite its journalled end being disposed in and piloted by said recess, the rotatable adjustment of said mounting member serving to shift the position of the stem whereby to variably adjust the relative openings of the two valve members when the two opposite lobes are positioned to open the two valve members.

3. A mixing type valve for hot and cold water control comprising, a body having a substantially central chamber therein, two substantially oppositely disposed valve chambers in the body for connection to hot and cold water supply pipes, said valve chambers opening into the central chamber, a ball valve in each valve chamber, a seat in each valve chamber upon which the ball valves seat to close the chambers, outlet means leading from the chamber, an operating stem journalled near one end and having an accessible operating stem, said stem extending through the chamber, a cam construction on the stem at the location of the ball valves having two substantially opposite lobes and a single lobe positioned substantially midway between the two opposite lobes, dwell portions between the lobes, said lobes being operable on the ball valves to displace the ball valves from their seats, the dwells being inoperable on the ball valves, whereby both valves may be opened by the opposite lobes and one valve opened by said one lobe, and adjustable means for piloting the end of the stem opposite the journalled end and operable to adjustably shift the piloted end of the valve stem between the two valve chambers whereby the degree of opening of the two ball valves relative to each other may be varied.

GEORGE S. ELLIOTT.

No references cited.